United States Patent [19]

Rembaum et al.

[11] 4,119,581

[45] Oct. 10, 1978

[54] MEMBRANE CONSISTING OF POLYQUATERNARY AMINE ION EXCHANGE POLYMER NETWORK INTERPENETRATING THE CHAINS OF THERMOPLASTIC MATRIX POLYMER

[75] Inventors: Alan Rembaum, Altadena; Carl J. Wallace, La Crescenta, both of Calif.

[73] Assignee: California Institute of Technology, Pasadena, Calif.

[21] Appl. No.: 771,245

[22] Filed: Feb. 23, 1977

[51] Int. Cl.[2] .................. C08L 39/08; C08J 5/22; B01D 15/04
[52] U.S. Cl. .................. 521/27; 210/24 R; 260/2.1 E; 260/17 A; 260/858; 260/886; 260/895; 260/898; 260/900; 260/901; 521/62; 521/32
[58] Field of Search .............. 260/2.2 R, 17 A, 823, 260/895, 2.1 R, 2.1 E; 210/24 R

[56] References Cited

U.S. PATENT DOCUMENTS

| 3,944,485 | 3/1976 | Rebawn et al. | 260/2.1 E |
|---|---|---|---|
| 4,007,138 | 2/1977 | Konig | 260/2.1 E |
| 4,014,798 | 3/1977 | Rebawn | 260/2.2 R |

*Primary Examiner*—Joseph L. Schofer
*Assistant Examiner*—Peter F. Kulkosky
*Attorney, Agent, or Firm*—Marvin E. Jacobs

[57] ABSTRACT

An ion-exchange membrane is formed from a solution containing dissolved matrix polymer and a set of monomers which are capable of reacting to form a polyquaternary ion-exchange material; for example vinyl pyridine and a dihalo hydrocarbon. After casting the solution and evaporation of the volatile components, a relatively strong ion-exchange membrane is obtained which is capable of removing anions, such as nitrate or chromate from water. The ion-exchange polymer forms an interpenetrating network with the chains of the matrix polymer.

28 Claims, 2 Drawing Figures

MEMBRANE CONSISTING OF POLYQUATERNARY AMINE ION EXCHANGE POLYMER NETWORK INTERPENETRATING THE CHAINS OF THERMOPLASTIC MATRIX POLYMER

ORIGIN OF THE INVENTION

The invention described herein was made in the performance of work under a National Aeronautics and Space Administration contract and is subject to the provision of Section 305 of the National Aeronautics and Space Act of 1958, Public Law 83-568 (72 Stat. 435; 42 USC 2457).

BACKGROUND OF THE INVENTION

1. Field of the Invention

The present invention relates to ion-exchange materials and, more particularly, to the in-situ polymerization of a cationic ion-exchange material in a solution of thermoplastic matrix resin.

2. Description of the Prior Art

The need to comply with ever-tightening environmental standards dictates that serious consideration be given to novel techniques for removing and/or recovering harmful contaminants from our waters. Chromium is one of these contaminants which has been classified as a toxic pollutant and, consequently, should not be discharged into waterways. Because of its widespread use in the plating industry and as a corrosion inhibitor in cooling tower systems, chromium is ubiquitous in the environment and its recovery would result in economic returns as well as producing a positive environmental impact.

Nitrate has been established as one of the ten inorganic chemicals designated by the National Interim Primary Drinking Water Regulations for systematic analysis in all public water supplies (effective June 1977). Nitrate is recognized as a noxious contaminant in water not only because it is a rich nutrient for biological growth such as algae blooms but because it is toxic to humans and animals resulting in methemoglobinemia, a disease effecting the oxygen carrying capacity of the blood hemoglobin. Infants are extremely susceptible (blue babies).

With the discovery that nitrosamines may be toxigenic and even carcinogenic, another dimension has been added to the chronic effects of nitrate. Nitrosamines are formed by the interaction between nitrites and secondary or tertiary amines under conditions similar to those found in the mammalian stomach. Nitrates are normally removed from waters by anaerobic denitrification, ion-exchange, electrodialysis, and reverse osmosis. Activated carbon is not effective as a scavenger for nitrate since it leaves high residual nitrate in the effluent.

Since ion-exchange hollow fibers require little pumping cost and no regeneration, it is conceivable that highly stable hollow fibers could provide a cost-effective means of simultaneously removing these contaminants and possibly even concentrating them for subsequent fertilizer usuage.

Current technology for removal of ions from dilute streams is largely oriented to the use of conventional packed, ion-exchange beds. These processes, however, have their problems. There is, for example, significant current effort toward the development of macroreticular pores in the ion-exchange beads which would be less susceptible to irreversible clogging. There are problems in the preparation of beads which have adequate porosity but which are still not unduly fragile. In the preparation of commercial ion-exchange beads, the process is as follows:

A cross-linked polymer bead is formed by reacting, for example, styrene and divinylbenzene. The percentage of cross-linker (divinylbenzene) determines the extent of swelling in the final bead as ions are exchanged. The greater the percentage of cross-linker, the less the swelling. Concurrently, the greater the level of cross-linker, the slower will be the diffusion of exchanging ions into and out of the beads, and the slower will be the process.

After the bead is formed, a chemical reaction such as sulfonation or chlormethylation is used to form the ion-exchange sites. From the description it is apparent that there are conflicting demands: high cross-link density helps stability but reduces product rate. Similarly, high ion-exchange capacity from the second step induces large swelling excursions, but provides greater capacity. Swelling of the resin beads occurs due to the osmotic pressures which are generated when the beads are exposed to different concentrations of various electrolytes. Pressure drop build-up is irregular and troublesome in regeneration processes. The choice of operating cycles is not straightforward at all and the beads are not inexpensive.

An alternative exists in semipermeable flat membranes but the technology is still in its infancy and the cost to efficiency ratio of membrane processes is not very satisfactory. Ion-exchange membranes offer significant advantages in separation processes with respect to ion-exchange resin beads. When the ion-exchange resins are in the form of membranes, they can be in contact with the solution to be separated and the stripping solution simultaneously and the ion-exchange process can be continuous rather than cyclic.

Ion-exchange membranes cannot be manufactured by the same techniques utilized to form ion-exchange beads since the swelling resulting from the formation of the ion-exchange site is too great to be borne by membranes which have a low degree of cross-linking. However, if the degree of cross-linking is raised, the membrane is too brittle to be useful. Most flat ion-exchange membranes are formed by first forming ion-exchange beads and then milling the beads into a thermoplastic resin as a binder for the resin structure. In a more recent process, the thermoplastic resin is milled in the presence of a swelling agent which is then replaced with a graftable ionic monomer. After grafting, the ionic site is bound to the membrane. The mechanical requirements are satisfied by using relatively thick sheets, in the range of 100–300 microns.

Anionic exchange hollow fibers have not been reported. Sulfonic acid cationic exchange type of hollow fibers have been prepared by irradiating polyethylene hollow fibers, immersing the irradiated fibers in styrene and heating the mixture to effect grafting. The fibers are then swollen in dichloromethane and sulfonated with chlorsulfonic acid, followed by hydrolysis. This procedure requires several steps, effects a random ion-exchange capacity and is limited to special reactants. Post-treatment of hollow fibers is further limited since the very small cross-section of the fibers and the fine porosity of the walls prevents introduction of preformed polymers into the bore or impregnation into the walls.

Ion-exchange fibers are disclosed in U.S. Pat. No. 3,944,485 in which monomers are extruded into the bore of a hollow fiber and into the pores of the wall and react therein to form insoluble ion-exchange material. This process which is practiced on preformed fibers, affects the permeability thereof and is unduly complicated and expensive.

SUMMARY OF THE INVENTION

A novel ion-exchange membrane is provided in accordance with the invention which can be utilized in sheet form or in the form of hollow or solid fibers. The membrane is produced in a simple and inexpensive manner and the membranes are capable of rapid and continuous removal of anions from aqueous solution. The membranes are more uniform and more densely charged than impregnated membranes and stability is greatly improved.

The membranes are fabricated by forming a solution of a matrix resin and monomers in common solvent. The monomers are capable of reacting to form a polyquaternary, ion-exchange polymer. The solution is formed into either a sheet or fiber by pouring the solution into a casting form such as a continuous belt or tray with raised runner edges or the solution is extruded through a die to form a solid rod or a hollow fiber. After casting or extrusion, as the solvent is evaporated the monomers react to form cross-linked, ion-exchange polymers which interpenetrate the matrix resin. Excess unreacted monomers are removed from the film by washing with solvent before use. The membrane behaves more like a homogenous resin than a heterogenous composite since the matrix resin is a continuous phase with the polyquaternary resin interpenetrating the matrix resin which strengthens rather than weakens the matrix resin.

The matrix resin is a linear thermoplastic polymer capable of solution in a common solvent for the ion-exchange monomers. Representative materials are acrylic resins such as polyacrylonitrile, polyolefins such as polypropylene, polystyrene, cellulose esters, polyurethanes and fluorocarbons. Preferred materials are tough, high tensile strength elastomers which can withstand the repeated flexing and pulsing experienced in membrane and hollow fiber water treatment apparatus. Best results have been obtained with polyether or polyester polyurethanes such as Estanes and vinylidene fluoride and hexafluoropropylene or chlorotrifluoroethylene copolymers such as Viton or Kel-F. Furthermore, these matrix resins are capable of functioning in oxidizing environments.

The ion-exchange resin must be present in a minimum amount of 20% based on total resin content in order to provide adequate ion-exchange function. The ionic halogen content of the membrane should be at least 5% by weight, generally 10–20% by weight. However, at ion-exchange resin content of 80% by weight, the membrane becomes too brittle. Preferred range of ion-exchange resin is from 20% to 65% by weight.

The common solvent is an inert, volatile organic solvent and may be a ketone or an ether such as tetrahydrofuran (THF). The total resin-monomer dilution should usually be no more than 40% w/v in order to obtain adequate dispersion, usually from 5 to 25% w/v.

The polymerizable ion-exchange monomers react to form a cross-linked, water insoluble polyquaternary polymer in which the quaternary nitrogens are present in the chains or in bridges joining the chains. The polymers are formed from the reaction of polytertiary amine compounds with organic polyhalides, each containing at least three carbon atoms.

One series of polymers disclosed in U.S. Pat. No. 3,899,534 are prepared by reaction of a halomethylated aromatic compound with a tertiary amine compound; one of the compounds being at least trifunctional in order to form a cross-linked material as follows:

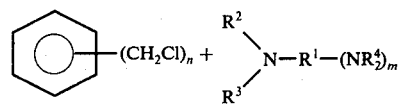

where $n$ is 2,3 and $m$ is 1–3, the sum of $n$ and $m$ being at least 4 and $R^2$, $R^3$ and $R^4$ are alkyl to 1 to 6 carbon atoms or may be joined into a saturated or unsaturated ring structure and $R^1$ is an aliphatic aromatic group containing at least 3 carbon atoms. Terpolymers can also be formed by reacting a diamine and an organic dihalide with the use of 0.1 to 30% 2,3,6,-trichloromethyl mesitylene as a cross-linking agent.

Unsaturated intermediates capable of cross-linking by free radical or condensation reaction are also utilizable in the invention. The intermediates are selected from compounds of the formula:

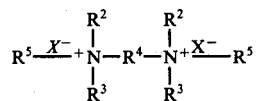

where $R^5$ is an organic group containing ethylenic unsaturation, preferably as a terminal vinyl group and $R^1$ is a divalent group of 2 to 20 or more carbon atoms which may be alkylene, arylene, alkenylene, alkynylene, alkarylene, etc.

The intermediate may be prepared by reacting a ditertiary amine with a quarternizing reagent, $R^2Z$ where Z is an anion such as chlorine or bromine or by reacting an unsaturated monotertiary amine with a diquaternizing reagent $Z-R^1-Z$. The amine may be a tertiary-aminoacrylate ester such as N,N-dimethylaminethyl acrylate or methacrylate or a vinyl pyridine. The acrylate compounds form quaternized intermediates which can be further polymerized by heat, radiation or free radical catalyst to form a cross-linked insoluble, polyquaternary polymer. However, the vinyl pyridine intermediates, spontaneously proceed to cross-linked polymers at room temperature.

Quaternized, cross-linked, insoluble copolymers of unsubstituted and substituted vinyl pyridines and a dihalo organic compound are spontaneously formed at ambient temperature on mixing the two monomers in bulk, in solution or in suspension as disclosed in U.S. Pat. No. 3,754,055, the disclosure of which is incorporated herein by reference. The amount of cross-linking may be varied according to the composition and reaction conditions.

The polyquaternary, water insoluble, cross-linked materials are prepared by reacting a vinyl pyridine with a dihalo organic compound of the formula:

where X is halo, preferably bromo, chloro or iodo and $R_1$ is a divalent organic radical such as alkylene, alkenylene, alkynylene, arylene, alkarylene or aralkylene. $R_1$ may also be alkylthioalkylene or alkyloxyalkylene of the formula $(CH_2)_x(Z)_y(CH_2)_z$, where Z is oxygen or sulfur and x, y and z are integers from 1 to 100. $R_1$ may also be of prepolymer or polymeric length of up to 6,000 molecular weight such as a bromo-terminated polybutadiene, but, preferably has a carbon content of from 1 to 20 carbon atoms to provide an increased charge center density per unit volume and weight of the polymeric product. $R_1$ may be substituted with other groups that do not interfere with the polymerization reaction or properties of the polymer product such as hydroxyl, alkyl, aryl, nitro, cyano or similar groups.

Representative dihalo organic compounds are $\alpha,\omega$-alkylene or alkenylene halides such as dibromo methane, 1,2-dibromoethane, 1,3-dibromopropane, 1,4-dibromobutane, 1,4-dibromo-2-butene, 1,4-dichloro-2-butene, 1,4-dibromo-2,3-dihydroxy butane, 1,5-dibromopentane, 1,6-dibromohexane, 1,8-dibromooctane, 1,10-dibromodecane, and 1,16-dibromohexadecane. The alkenylene compounds such as 1,4-dibromobutene are found to be more reactive than the corresponding saturated compounds. Dihaloaromatics such as o, m and p-dichloro- or o, m and p-dibromoxylene are also suitable. Cross-linked, insoluble products would also be formed from tertiary brominated prepolymers such as polyethylenes, polypropylenes, polybutylenes, polybutadienes, polyoxyethylene, etc. As the number of carbon atoms in the dihalide increases, elastomeric properties are favored and polyelectrolyte properties decrease.

4-vinyl pyridine is the most reactive of the vinyl pyridine isomers. However, 2-methyl-5-vinyl pyridine is available at lower cost and provides products of similar properties. 2-vinyl pyridine has been found to be much less reactive than the other monomers.

The polycationic, cross-linked products are prepared simply by mixing the vinyl pyridine monomer with the dihalide in various proportions and allowing the mixture to react until solid materials are formed.

The reaction is believed to proceed through a first stage in which two molecules of vinyl pyridine react with a molecule of a dibromide to form a quaternary intermediate as illustrated below:

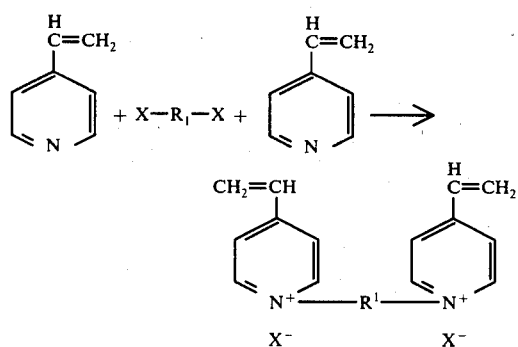

Two molecules of the intermediate dicationic, diunsaturated cross-linking agent then react through the vinyl group to form an intermediate having a structure of the formula:

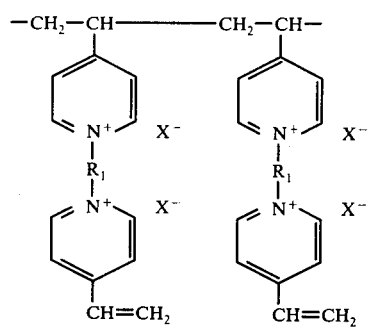

The intermediate reacts further to give a cross-linked network with a small amount of residual unsaturation. Although this mechanism is dominant, other intermediates are also formed. The reaction proceeds spontaneously at room temperature, about 25° C., but may be accelerated by heating the reaction to a higher temperature, usually below 100° C., and suitably from 25°-60° C. The unsaturation on the growing polymer as well as on the finished resin may be utilized in further reactions, e.g. grafting onto substrates by means of Co $\gamma$ radiation.

Cross-linking of the product is also facilitated by irradiating the mixture with radiation capable of forming reactive species to cross-link the vinyl groups, suitably gamma radiation from a cobalt source. The reaction may be conducted in bulk, in a solvent for the monomer or in water suspension. The reaction proceeds faster in bulk, but yields are higher in solvents. Higher yields are favored in polar solvents such as dimethylsulfoxide, dimethylformamide, methanol, ethanol, or combinations thereof. Particularly high yields have been obtained with a 1/1 volume mixture of dimethylformamide and methanol. Slower reaction occurs in solvents such as benzene.

The rate of reaction is found to be much higher with bromides, as compared to the corresponding chlorides. The ratio of monomers is controlled such that there is an excess of dibromide in the mixture. A suitable ratio is a stoichiometric ratio of 2 mols of vinyl pyridine to at least 1 mol of the dibromide. It has been found that when the polymerization is conducted with an excess of vinyl pyridine, unchanged vinyl pyridine can be recovered. It has further been found that oxygen and carbon dioxide interfere, inhibit and slow the reaction. Also free radical inhibitors such as hydroquinone do not interfere or slow down the reaction rate. Higher polymerization rates are favored by conducting the reaction in vacuum. The properties of the polymer products can be varied by using excess of dihalide. The resulting product in this case contains nonionic halogen capable of further reaction. Any residual halogen in the ion-exchange resin particle or the nonionic halogen introduced by use of excess dihalide can be further reacted with a monoquaternizing reagent such as trimethylamine, dimethylamine or pyridine to increase the ion-exchange capacity of the particles and of the fiber.

The properties of the polymer products can be further varied by conducting the polymerization in the presence of excess monomer and a molecule capable of monoquaternization such as alkyl or alkenyl halide, hydrogen halide, dimethylsulfate, etc. The amounts of the quaternizing species are varied in such a way as to maintain the proportions: 2 moles of vinyl pyridine to 1 mole of dihalide and, 1 mole of vinyl pyridine to 1 mole of quaternizing species. Thus, for a polymer formed from a mixture containing 1 mole of dihalide and 0.5 mole of quaternizing agent, 2.5 moles of vinyl pyridine are required. By varying these proportions, different amounts of cross-linking are obtained and the resulting resins differ mainly in their swelling properties.

The novel ion-exchange membranes of the invention will find use in reverse osmosis, electrodialysis and conventional ion-exchange. The solvent casting technique has been shown to be an excellent method for incorporating a positively charged ion-exchange resin into a polymeric substrate and the membrane fibers are fairly uniform in composition and exhibit high charge density.

These and many other features and attendant advantages of the invention will become readily apparent as the invention becomes better understood by reference to the following detailed description when considered in conjunction with the accompanying drawings.

DESCRIPTION OF THE PREFERRED EMBODIMENTS

Figure 1:
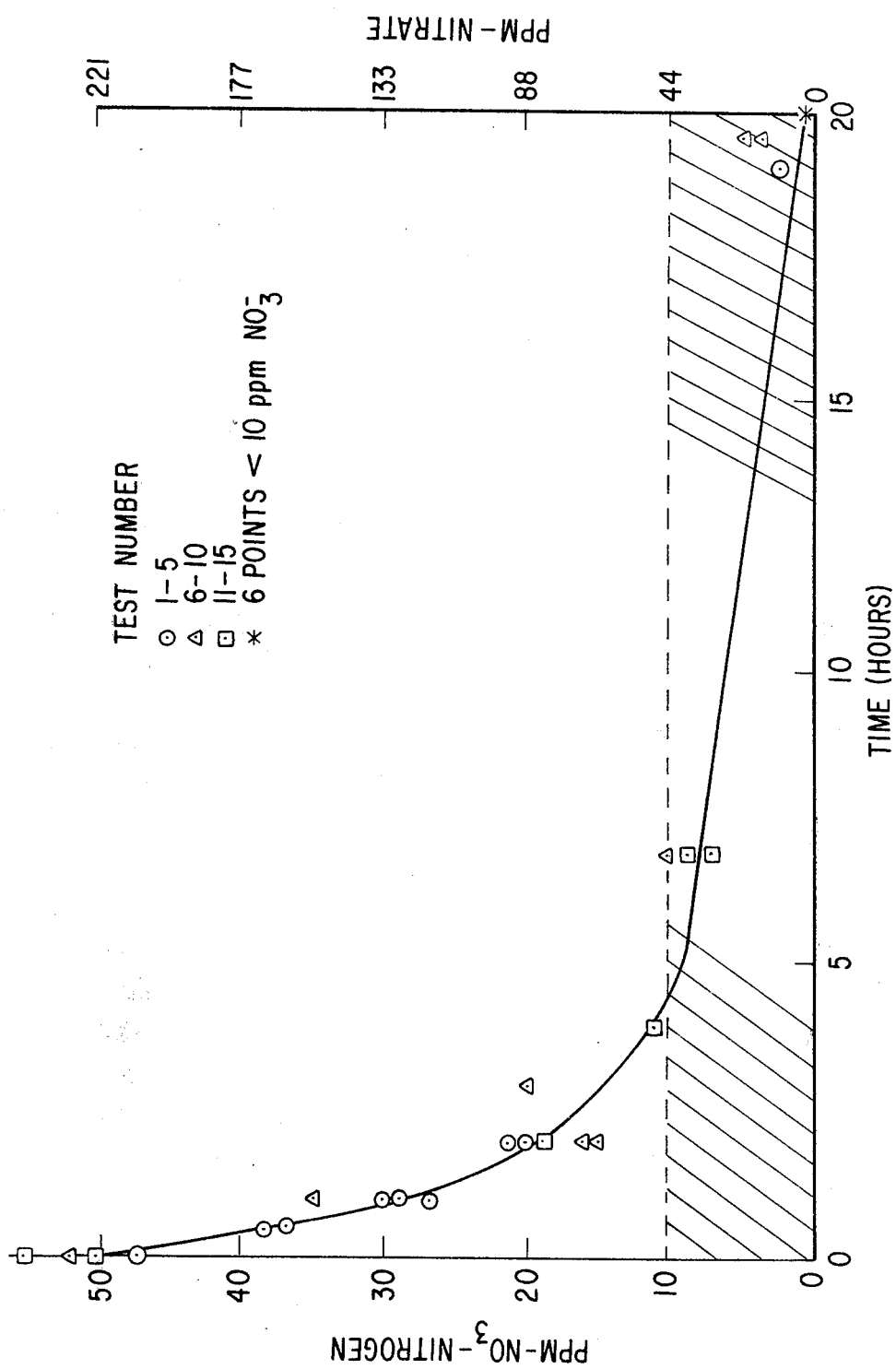
FIG. 1 is a graph showing nitrate removal from water with PPM-$NO_3$ as nitrogen as one ordinate, PPM-Nitrate as the other ordinate and Time (Hours) as abscissa.

Membranes were cast on glass plates using stoichiometric mixtures of 2 moles of 4-vinyl pyridine (4-VP) and 1 mole of dibromohexane (DBH). These were added to commercially obtained polymers of either Kel-F, Viton or polyurethane, dissolved in methylethyl ketone (10–20% w/v) or other organic solvent.

EXAMPLE 1

A 10% tetrahydrofuran (THF) solution of Goodrich Estane 5710-F1(100g) was mixed with 4-vinlypyridine (6.3g) and 1,6-dibromohexane (7.32g). Estane 5710-F1 is a solution coating grade aromatic polyester based polyurethane. The mixture was poured into a leveled 7 × 7 inch glass dish in a hood. The glass dish was covered with a polyethylene sheet and left at room temperature for 120 hours. The 18 mil thick formed membrane (ionic bromine content 14.0%) was covered with methanol (2 hours), removed from the dish and washed with methanol (200cc) and distilled water (200cc). It was then kept in distilled water before testing.

EXAMPLE 2

Kel-F (copolymer of vinylidene fluoride and chlorotrifluoroethylene) membranes of 10 and 11 mil thickness were prepared with 50% vinyl pyridine-dibromohexane resin content by the solvent casting technique of Example 1.

The test equipment for determining transport properties of the various resin-impregnated membranes consists of two glass cylindrical compartments separated by an O-ring seal and the membrane under study. A metal clamp holds the compartments together and compresses the O-ring resulting in a sealed system. The lower compartment is equipped with a Teflon stirring bar and is mounted on a magnetic stirrer while the upper compartment has an externally driven stirring mechanism. Total membrane contact area is 15 $cm^2$.

For nitrate removal studies with chloride pumping ion, 140 ml. of a solution of $10^{-2}$M $NaNO_3$, corresponding to 140 PPM $NO_3$—N (nitrate expressed as nitrogen), and $10^{-1}$ M NaCl was contained in the lower compartment and served as the strip or pump solution. The upper compartment contained the feed solution, 100 ml. of 50 PPM $NO_3$—N. $NaNO_3$ was included in the pump solution in order to demonstrate $NO_3^-$ transport against a concentration gradient.

The method of analysis of nitrate in water was the Cadmium Reduction Procedure (colorimetric). This procedure is adaptable to both high nitrate levels, mg/l or PPM range, and low nitrate levels, $\mu$g/l or PPB range. Details of these methods are discussed in the Hach Chemical Company Catalog.

Free chlorine, present as hypochlorous acid and/or hypochlorite ion, was determined by the DPD procedure of Standard Methods. It offers high sensitivity of approximately 0.02 mg/l chlorine (Cl), rapid color development, and minimal fading.

Nine tests for nitrate transport with chloride pumping ion were performed with the 11 mil Kel-F sample. The 10 mil Kel-F film was tested three times by the usual procedure and demonstrated a decreasing nitrate flux.

The polyurethane film of 18 mils thickness (Example 1 was tested a total of 15 times covering 40 days for nitrate removal with chloride ion. The film is stored in contact with pumping solution and is repeatedly available for nitrate removal after an extended time, e.g., 6 months and 1 year.

The results of the Kel-F and polyurethane tests are presented in Tables 1 and 2 respectively.

TABLE 1

NITRATE TRANSPORT BY KEL-F FILMS IMPREGNATED WITH VINYLPYRIDINE-DIBROMOHEXANE RESIN (chloride pumping ion)

| SUB-STRATE | MONOMER CONC. (%) | STRIP OR PUMPING SOLUTION Conc. (Molarity) | Volume (ml) | FEED SOLUTION Conc. (Molarity) | Vol. (ml) | CONTACT TIME (hr) | ANALYSIS OF FEED SOLUTION PPM $NO_3$—N | PPM $Cl^-$ |
|---|---|---|---|---|---|---|---|---|
| Kel-F (11 mils) Test 1 | 50 | $10^{-2}$ $N_aNO_3$ $10^{-1}$ $N_aCl$ | 140 | 3.58 × $10^{-3}$ $N_aNO_3$ | 100 | 0 1.0 2.0 19.0 | 42 39 36 8 | |
| Test 2 | " | " | " | " | " | 0 1.0 2.0 20.0 | 47 45 40 17 | 18 120 |
| Test 3 | " | " | " | " | " | 0 1.0 | 39 35 | |

TABLE 1-continued
NITRATE TRANSPORT BY KEL-F FILMS IMPREGNATED WITH VINYLPYRIDINE-DIBROMOHEXANE RESIN (chloride pumping ion)

| SUB-STRATE | MON-OMER CONC. (%) | STRIP OR PUMPING SOLUTION Conc. (Molarity) | Vol-ume (ml) | FEED SOLUTION Conc. (Molarity) | Vol. (ml) | CONTACT TIME (hr) | ANALYSIS OF FEED SOLUTION PPM $NO_3-N$ | PPM $Cl^-$ |
|---|---|---|---|---|---|---|---|---|
| Test 4 | " | " | " | " | " | 2.0 | 32 | |
| | | | | | | 18.5 | 12 | |
| | | | | | | 0 | 40 | |
| | | | | | | 1.0 | 44 | |
| | | | | | | 2.0 | 38 | |
| | | | | | | 20.0 | 12 | |
| Test 5 | " | " | " | " | " | 92.0 | <2 | |
| | | | | | | 0 | 58 | |
| | | | | | | 2.0 | 44 | |
| | | | | | | 19.0 | 15 | |
| Test 6 | " | " | " | " | " | 0 | 47 | |
| | | | | | | 2 | 43 | 30 |
| | | | | | | 18 | 17 | 185 |
| | | | | | | 42 | <3 | 310 |
| Test 7 | " | " | " | " | " | 0 | 47 | |
| | | | | | | 288 | <2 | |
| Test 8 | " | " | " | " | " | 0 | 47 | |
| | | | | | | 24 | 6 | |
| Test 9 | " | " | " | " | " | 0 | 50 | |
| | | | | | | 1.0 | 36.5 | |
| | | | | | | 2.0 | 33.5 | |
| | | | MEMBRANE PUNCTURED BY STIRRING ROD | | | | | |
| Kel-F (10 mils) | 50 | " | " | " | " | 0 | 42 | |
| | | | | | | 1.0 | 34 | |
| | | | | | | 2.0 | 32 | 60 |
| | | | | | | 20.0 | 27 | 60 |
| Test 2 | " | " | " | " | " | 0 | 39 | |
| | | | | | | 2.0 | 40 | |
| | | | | | | 18.5 | 32 | |
| Test 3 | " | " | " | " | " | 0 | 42 | |
| | | | | | | 1.0 | 50 | |
| | | | | | | 2.0 | 52 | |
| | | | | | | 20 | 47 | |
| | | | | | | 92 | 45 | |

TABLE 2
NITRATE TRANSPORT BY POLYURETHANE FILMS IMPREGNATED WITH VINYLPYRIDINE-DIBROMOHEXANE RESIN (chloride pumping ion)

| SUB-STRATE | MON-OMER CONC. (%) | STRIP OR PUMPING SOLUTION Conc. (Molarity) | Vol-ume (ml) | FEED SOLUTION Conc. (Molarity) | Vol. (ml) | CONTACT TIME (hr) | ANALYSIS OF FEED SOLUTION PPM N | PPM $Cl^-$ |
|---|---|---|---|---|---|---|---|---|
| Polyurethane (18 mils) Test 1 | 58 by weight | $10^{-2}$ $NaNO_3$ $10^{-1}$ NaCl | 140 | $3.58 \times 10^{-3}$ $NaNO_3$ | 100 | 0 | 47 | |
| | | | | | | 0.5 | 38 | |
| | | | | | | 1.0 | 29 | |
| | | | | | | 2.0 | 21 | |
| | | | | | | 20 | <2 | |
| | | | | | | 22 | <2 | 100 |
| Test 2 | " | " | " | " | " | 0 | 52 | |
| | | | | | | 0.5 | 36.5 | |
| | | | | | | 1.0 | 30 | |
| | | | | | | 2.0 | 20 | |
| | | | | | | 19.0 | 3 | |
| | | | | | | 25.0 | <2 | |
| Test 3 | " | " | " | " | " | 0 | 50 | |
| | | | | | | 65 | 3 | |
| Test 4 | " | " | " | " | " | 0 | 52 | |
| | | | | | | 0.5 | 38 | |
| | | | | | | 1.0 | 27 | |
| | | | | | | 2.0 | 19 | |
| | | | | | | 19 | 3 | |
| Test 5 | " | " | " | " | " | 0 | 47 | |
| | | | | | | 91.5 | 7 | |
| Test 6 | " | " | (BOTTOM AGITATION ONLY) " | " | " | 0 | 50 | |
| | | | | | | 19.5 | 5 | |
| Test 7 | " | " | " | " | " | 0 | 50 | |
| Test 8 | " | " | " | " | " | 0 | 52 | |
| | | | | | | 2.0 | 15 | |
| | | | | | | 7.0 | 10 | |
| | | | | | | 72 | <2 | |
| Test 9 | " | " | " | " | " | 0 | 52 | |
| | | | | | | 2.0 | 16 | |
| | | | | | | 24 | <2 | |
| Test 10 | " | " | " | " | " | 0 | 52 | |
| | | | | | | 1.0 | 35 | |

TABLE 2-continued

NITRATE TRANSPORT BY POLYURETHANE FILMS
IMPREGNATED WITH VINYLPYRIDINE-DIBROMOHEXANE RESIN
(chloride pumping ion)

| SUB-STRATE | MONOMER CONC. (%) | STRIP OR PUMPING SOLUTION Conc. (Molarity) | STRIP OR PUMPING SOLUTION Volume (ml) | FEED SOLUTION Conc. (Molarity) | FEED SOLUTION Vol. (ml) | CONTACT TIME (hr) | ANALYSIS OF FEED SOLUTION PPM N | ANALYSIS OF FEED SOLUTION PPM Cl⁻ |
|---|---|---|---|---|---|---|---|---|
| Test 11 | " | " | " | " | " | 3.0 | 20 | 3 |
|  |  |  |  |  |  | 22 | 0 | 50 |
|  |  |  |  |  |  |  | 7 | 7 |
| Test 12 | " | " | " | " | " | 24 | 0 | <2 |
|  |  |  |  |  |  |  | 4 | 52 |
|  |  |  |  |  |  |  |  | 11 |
| Test 13 | " | " | " | " | " | 72 | 0 | 3 |
|  |  |  |  |  |  |  | 7.0 | 50 |
|  |  |  |  |  |  |  |  | 9 |
| Test 14 | " | " | " | " | " | 23 | 0 No | <2 |
|  |  |  |  |  |  |  | 1.5 Agita- | 50 |
|  |  |  |  |  |  |  | 72 tion | 32 |
|  |  |  |  |  |  |  |  | 3 |
| Test 15 | " | " | " | " | " |  | 0 | 55 |
|  |  |  |  |  |  |  | 2.0 | 19 |
|  |  |  |  |  |  |  | 22 | 3 |

Chloride ion as a pumping ion was used because it is innocuous in low concentrations, contributing only to total dissolved solids, and is inexpensive. In addition, polymer stability is good in chloride solution.

Of the resin impregnated membranes tested for nitrate removal from water with chloride pump ion, Kel-F and polyurethane gave the most promising results. Kel-F films of 11 and 10 mil thicknesses were tested nine times for the 11 mil sample and three times for the 10 mil. It is apparent from Table 1 that the 11 mil material continued to remove nitrate over the three weeks testing period without any evidence of reduced flux. Essentially total nitrate removal was observed in tests 4 and 7 where the contact times were 92 and 288 hours, respectively.

Polyurethane of 18 mils thickness was subjected to 15 separate tests covering 40 days. Essentially total nitrate removal was observed in approximately 20 hours with no noticeable loss of nitrate flux during the testing period.

Referring now to FIG. 1, the Figure graphically depicts the nitrate reduction for the 15 tests. Also included in the graph is a shaded region below 10 PPM $NO_3$-N corresponding to standards from the National Interim Primary Drinking Water Regulations as issued by EPA in December 1975. Effective date for compliance is June 1977.

An initial flux value of 1 mg $NO_3$-N/hr. $cm^2$, measured over the first two hours of contact, was observed for the 15 tests. This time period corresponds to a high nitrate concentration and, therefore, a high nitrate flux. For the time period from 7 to 20 hours, which corresponds to a nitrate reduction from 8 to less than 2 mg/l $NO_3$-N, the flux was 0.02 mg $NO_3$-N/hr. $cm^2$. The polyurethane impregnated film showed no noticeable deterioration over the 40 days of testing. Furthermore, flux values remained very consistent for the testing period.

EXAMPLE 3

The solvent casting procedure of Example 1 was used for the preparation of Viton (copolymer of vinylidine fluoride and chlorotrifluoropropylene) membranes containing 33, 50 and 67 percent by weight 4-VP-DBH ion exchange resin. Film thickness ranged from 6 mils for one specimen of 33 percent to 28-33 mils for a very irregular 67 percent sample. The 50 percent material of 10 mils thickness was very uniform in thickness and appearance, and was tested for nitrate removal a total of six times, after which a severe split was observed around the O-ring seal. A second Viton 50 percent sample of 9 mils thickness was tested five times with consistent results.

The Viton 33 percent (10-12 mils) experienced cracks after contact for only two days. Two samples of Viton 33 (6 mils) were tested for different periods of time. Specimen 1 was tested only once and gave very slow nitrate reduction after 19 hours in one test and 91.5 hours in the second. The Viton 67 percent film was extremely thick and brittle, irregular in appearance, and not suitable for testing.

In order to perform an economic evaluation of ion exchange membranes or hollow fibers, it is first necessary to determine projected surface area requirements. The following calculation, based on a capacity of 10,000 gal/day, illustrates this:

| Assumed capacity: | 10,000 gal/day |
|---|---|
| Feed water: | 50 PPM Nitrate-N |
| Effluent water: | 10 PPM Nitrate-N (Interim drinking water standard) |
| Strip or pumping solution: | $10^{-1}$ molar NaCl |
| Membrane or Hollow Fiber: | Polyurethane | flux/measured over initial 2 hr. =
$$30 \text{ mg } N \times \frac{1}{2 \text{ hr.}} \times \frac{1}{15 \text{ cm}^2} = 1 \frac{\text{mg } N}{\text{hr. cm}^2}$$

This calculation is based on the nitrate removal rate over the initial 2 hours for the polyurethane film of this study (see FIG. 1).

Membrane or Fiber Requirement:

$$10,000 \frac{\text{gal}}{\text{day}} \times 3.79 \frac{\text{liter}}{\text{gal}} \times \frac{40 \text{ mg } N}{\text{liter}} \times \frac{\text{day}}{24 \text{ hr}} \times$$
$$\frac{\text{hr. cm}^2}{1 \text{ mg} N} \times \frac{\text{in}^2}{6.45 \text{ cm}^2} \times \frac{\text{ft.}^2}{144 \text{ in}^2} = 68 \text{ ft.}^2$$

Fiber requirement for $10 \times 10^6$ gal/day plant $$= 68 \frac{\text{ft.}^2}{10,000 \text{ gal/day}} \times 10 \times 10^6 \text{ gal/day}$$

$$= 68 \times 10^3 \text{ ft.}^2$$

For comparative purposes, the calculation of membrane or fiber area requirements should be determined from FIG. 1 for NO$_3$-N reduction from 8 ppm to approximately 2 ppm.

Nitrate nitrogen flux:

$$\text{flux/measured from 7 to 20 hr.} =$$
$$6 \text{ mg } N \times \frac{1}{13 \text{ hr}} \times \frac{1}{15 \text{ cm}^2} = 0.03 \frac{\text{mg } N}{\text{hr. cm}^2}$$

Membrane/Fiber requirement based on this nitrate flux:

$$10,000 \frac{\text{gal}}{\text{day}} \times 3.79 \frac{\text{liter}}{\text{gal}} \times 6 \frac{\text{mg } N}{\text{liter}} \times \frac{\text{day}}{24 \text{ hr}} \times$$

$$\frac{\text{hr. cm}^2}{0.03 \text{ mg } N} \times \frac{\text{in}^2}{6.45 \text{ cm}^2} \times \frac{\text{ft}^2}{144 \text{ in}^2} = 340 \text{ ft}^2$$

Fiber requirement for $10 \times 10^6$ gal/day plant $$= 340 \frac{\text{ft}^2}{10,000 \text{ gal/day}} \times 10 \times 10^6 \text{ gal/day}$$

$$= 0.340 \times 10^6 \text{ ft}^2$$

This compares with fiber requirements for reverse osmosis applications as follows:

$$10 \times 10^6 \frac{\text{gal}}{\text{day}} \times \frac{\text{day} \cdot \text{ft}^2}{10 \text{ gal}} = 10^6 \text{ ft}^2$$

typical R.O. Flux

Of the nitrate removal methods — reverse osmosis, ion exchange, and electrodialysis-ion exchange appears to be the primary competitor for the proposed hollow fiber ion exchange system. Cost estimates for a 10 MGD plant based on 1970 data are:

|  | cents/1000 gallons |
|---|---|
| reverse osmosis | 41.6 |
| electrodialysis | 17.0 |
| ion exchange | 12.0 |
| ion exchange hollow fiber | 9–17.5 |

Greatly improved transport rates should be experienced with thinner membranes and with the hollow fiber geometry where fluid velocities would be much higher.

EXAMPLE 4

Freshly distilled 4-vinyl pyridine (6.3 g) and 1,6-dibromohexane (7.32 g) were mixed with Viton dissolved in methylethyl ketone (100g, 13.1% of Viton). The mixture was poured into leveled containers covered with glass plates and left to polymerize for 140 hours at room temperature. At the end of this time, the membranes were washed with methanol and rinsed with distilled water. The ionic bromine content of the dry membrane was 13.0%.

EXAMPLE 5

Other Viton membranes containing 60, 67 and 70% 4-VP-DBH ion exchange resin were prepared by the procedure of Example 4.

EXAMPLE 6

Kel-F membranes containing 57, 73 and 84% 4-VP-DBH ion exchange resin were prepared by the procedure of Example 4 except that the polymerization period was 80 hours.

Testing equipment was as described before. For most tests, a solution containing $10^{-2}$ molar $K_2Cr_2O_7$ and $10^{-1}$ molar NaCl was in the lower compartment and served as the strip solution while $10^{-4}$ molar $K_2Cr_2O_7$ was above the membrane and served as the feed or waste solution. These solutions afforded the advantages of 1) visual detection of dichromate removal, 2) high chloride concentration, and 3) high dichromate concentration gradient against which the system must pump (a good test of the transport mechanism).

To confirm pumping action, $10^{-4}$ molar $K_2Cr_2O_7$ was placed in the lower chamber and $10^{-1}$ molar NaCl in the upper chamber. Movement of all the dichromate from the lower chamber, through the membrane, and into the upper chamber confirmed that Donnan pumping was actually occurring.

All dichromate analyses were performed by the colorimetric diphenylcarbazide procedure of Standard Methods. The minimum detectable concentration of chromium by this method is 0.005 PPM.

The Viton film containing 51 percent by weight ion exchange resin (Example 4) gave the most stable results retaining its initial chromium flux of 0.033 mg $Cr^{+6}$/hr cm$^2$ for nine tests covering a contact time of 7 days. Rapid deterioration was observed for tests ten and eleven with a final flux of 0.007 mg $Cr^{+6}$/hr cm$^2$.

Figure 2:
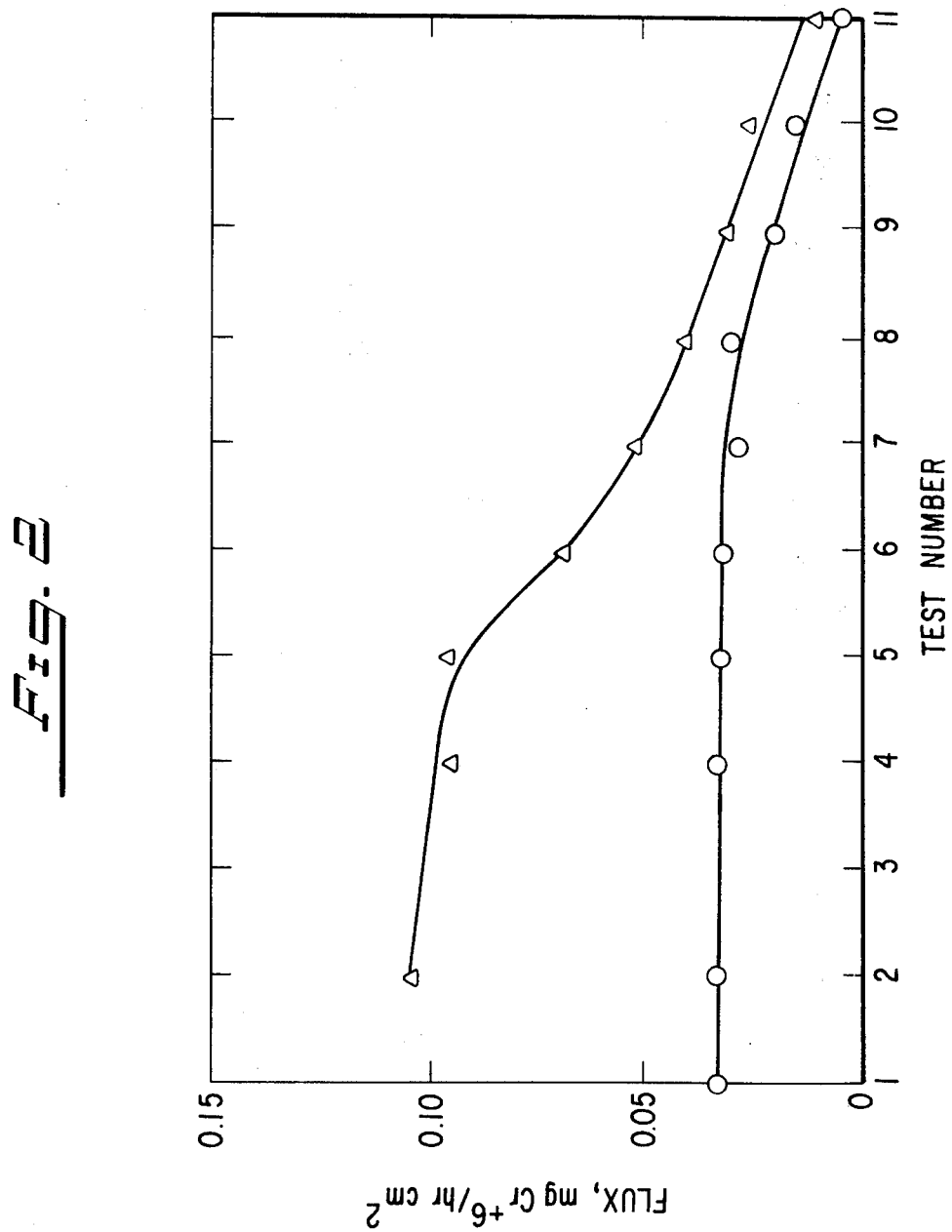
FIG. 2 is a set of curves demonstrating removal of dichromate ions, the upper curve showing initial flux measured over the initial 15 minutes and the lower curve showing flux over the initial 2 hours, the ordinate being flux expressed as mg $Cr^{+6}$/hr $cm^2$ and the abscissa being progressive test numbers on the same film.

The effect of contact time, as measured by the number of tests, on the chromium flux is presented graphically in FIG. 2. The flux for the initial 0.25 hours, depicted by the upper curve in FIG. 2, decreases very slowly for the first five tests and then decreases much more rapidly. The average flux over the initial two hours of transport showed a very stable value for nine tests as represented in the lower curve of FIG. 2. The tests shown were conducted on one membrane with the time between each test varying greatly. The membrane contact time between tests 1 and 9 was 7 days.

Resin content in the membranes is quite critical in determining stability of the film to dichromate. It appears that a resin content about 67 percent by weight yields a material much too brittle for sustained operation. Cracks and tears are observed to occur at stress points for film with high resin content. Resin content or charge density is also critical in establishing a high degree of dichromate transport.

The Kel-F membrane containing 73 percent ion-exchange resin developed tears after the second test while the 84 percent sample was much too brittle and split into many pieces prior to any testing for dichromate transport.

An initial flux of 0.033 mg $Cr^{+6}$/hr cm$^2$ was observed for the 57 percent by weight resin, Kel-F membrane, however, rapid deterioration and loss of dichromate transport capability was observed.

The Viton film with 51 percent by weight ion-exchange resin gave a high chromium flux and proved to be the most stable, giving the same 2 hour flux for nine tests covering seven days of contact. Kel-F films demonstrated rapid chromium transport but, in general, lost pumping action more rapidly than the Viton films. High resin content yields films which are much too brittle for ion transport. It appears that resin content of approximately 50-60 percent by weight gives maximum transport and demonstrate adequate flexbility. Commercial anion exchange membrane tested gave decreasing chromium transport with time. The initial two hour flux was lower than most membranes prepared by the solvent casting procedure. Solvent casting is an excellent method for preparing charged membranes of high charge density. Dichromate transport rates are of suitable magnitude to give reasonable and competitive area requirements for commercial applications.

It is to be realized that only preferred embodiments of the invention have been described and that numerous substitutions, modifications and alterations are permissible without departing from the spirit and scope of the invention as defined in the following claims.

What is claimed is:

1. A method of forming an ion-exchange membrane comprising the steps of:

dissolving in common solvent a thermoplastic matrix polymer, a first monomer selected from polytertiary amines or vinyl pyridines and a second monomer selected from organic polyhalides said first and second monomers being capable of reaction to form a cationically charged, polyquaternary, ion-exchange polymer;

evaporating the solvent while reacting the monomers to form said cationically charged, polyquaternary, ion-exchange polymer which forms a network interpenetrating the chains of the matrix polymer.

2. A method according to claim 1 in which the matrix polymer is a linear thermoplastic polymer.

3. A method according to claim 2 in which the matrix polymer is selected from acrylic, polyolefin, polystyrene, cellulose esters, polyurethanes and fluorocarbons.

4. A method according to claim 3 in which the matrix polymer is a polyether or polyester polyurethane elastomer.

5. A method according to claim 1 in which the ion-exchange monomers are present in an amount of at least 20% by weight based on total polymer.

6. A method according to claim 3 in which the solvent is selected from ketones and ethers.

7. A method according to claim 6 in which the polymermonomer dilution is no more than 40% w/v.

8. A method according to claim 2, in which the monomers react to form a cross-linked, water-insoluble, network polyquaternary polymer in which the quaternary nitrogens are present in the polymer chains or in bridges joining the chains.

9. A method according to claim 8 in which the first monomer is a polytertiary amine compound and the second monomer is an organic polyhalide.

10. A method according to claim 8 in which the ionic halogen content of the membrane is at least 5% by weight.

11. A method according to claim 10 in which at least one of the monomers is at least trifunctional.

12. A method according to claim 11 in which the first monomer is a vinyl pyridine and the second monomer is a dihalo organic compound of the formula:

$$X-R^1-X$$

where X is selected from bromo, chloro or iodo and $R^1$ is a divalent organic radial selected from alkylene, alkenylene, alkynylene, arylene, alkarylene, aralkylene or $-(CH_2)_x(Z)_y(CH_2)_z-$ where Z is oxygen or sulfur and $x, y$ and $z$ are integers from 1 to 100.

13. A method according to claim 12 in which $R^1$ contains from 1 to 20 carbon atoms and the vinyl pyridine is 4-vinyl pyridine.

14. A method according to claim 1 in which the solution is cast into a sheet form before evaporation of the solvent.

15. A method according to claim 1 in which the solution is extruded into fiber form before evaporation of solvent.

16. An ion-exchange membrane comprising:
   a linear thermoplastic matrix polymer; and
   a cross-linked, cationically charged, polyquaternary, ion-exchange network polymer interpenetrating the chains of the matrix polymer, said polyquaternary polymer comprising the reaction product of a first monomer selected from polytertiary amines or vinyl pyridines and a second monomer selected from organic polyhalides.

17. A membrane according to claim 16 in which the matrix polymer is selected from acrylic, polyolefin, polystyrene, cellulose esters, polyurethanes and fluorocarbons.

18. A membrane according to claim 17 in which the matrix polymer is a polyether or polyester polyurethane elastomer.

19. A membrane according to claim 16 in which the ion-exchange polymer is a polyquaternary polymer in which the quaternary nitrogens are present in the polymer chains or in bridges joining the chains.

20. A membrane according to claim 19 in which the ion-exchange polymer is present in an amount of at least 20% by weight.

21. A membrane according to claim 20 in which the polyquaternary ion-exchange polymer is the reaction product of a polytertiary amine and an organic polyhalide.

22. A membrane according to claim 20 in which the ionic halogen content of the membrane is at least 5% by weight.

23. A membrane according to claim 22 in which the polyquaternary polymer is the reaction product of a vinyl pyridine and dihalo organic compound of the formula:

$$X-R^1-X$$

where X is selected from bromo, chloro or iodo and $R^1$ is a divalent organic radial selected from alkylene, alkenylene, alkynylene, arylene, alkarylene, aralkylene or $-(CH_2)_x(Z)_y(CH_2)_z-$ where Z is oxygen or sulphur and $x, y$ and $z$ are integers from 1 to 100.

24. A membrane according to claim 23 in which $R^1$ contains from 1 to 20 carbon atoms and the vinyl pyridine is 4-vinyl pyridine.

25. A membrane according to claim 16 in sheet form.

26. A membrane according to claim 16 in fiber form.

27. A method of removing anions from aqueous solution comprising the steps of:
   interposing the membrane as defined in claim 16 between first aqueous solution containing the anion and a second aqueous stripping solution; and
   permeating the anions through the membrane from the first solution to the second solution.

28. A method according to claim 27 in which the anions are selected from chromates and nitrates.

* * * * *